(12) United States Patent
Anderson

(10) Patent No.: US 9,753,994 B2
(45) Date of Patent: Sep. 5, 2017

(54) SYSTEM AND METHOD FOR GENERATION OF ATTRIBUTE DRIVEN TEMPORAL CLUSTERING

(75) Inventor: David R. Anderson, Chaska, MN (US)

(73) Assignee: OPTUMINSIGHT, INC., Eden Prairie, MN (US)

( * ) Notice: Subject to any disclaimer, the term of this patent is extended or adjusted under 35 U.S.C. 154(b) by 700 days.

(21) Appl. No.: 12/818,681

(22) Filed: Jun. 18, 2010

(65) Prior Publication Data
US 2010/0325148 A1 Dec. 23, 2010

Related U.S. Application Data

(60) Provisional application No. 61/218,772, filed on Jun. 19, 2009.

(51) Int. Cl.
*G06F 17/30* (2006.01)

(52) U.S. Cl.
CPC .. *G06F 17/30551* (2013.01); *G06F 17/30598* (2013.01); *G06F 17/30646* (2013.01)

(58) Field of Classification Search
CPC ......... G06F 17/30598; G06F 17/30342; G06F 17/30551
USPC ........................................................ 707/769
See application file for complete search history.

(56) References Cited

U.S. PATENT DOCUMENTS

| | | | | |
|---|---|---|---|---|
| 5,440,730 | A * | 8/1995 | Elmasri et al. | |
| 5,778,893 | A * | 7/1998 | Potter | G06F 19/3456 128/898 |
| 7,080,059 | B1 * | 7/2006 | Poston et al. | 707/769 |
| 7,801,749 | B2 * | 9/2010 | Lynn et al. | 705/4 |
| 7,904,279 | B2 * | 3/2011 | Miguelanez et al. | 702/189 |
| 8,009,863 | B1 * | 8/2011 | Sharma | G06K 9/00335 348/159 |
| 8,015,136 | B1 * | 9/2011 | Baker et al. | 706/45 |
| 8,086,668 | B2 * | 12/2011 | Firminger et al. | 709/203 |
| 8,166,050 | B2 * | 4/2012 | Dampier | 707/748 |

(Continued)

OTHER PUBLICATIONS

Keogh et al., "Finding Surprising Patterns in a Time Series Database in Linear Time and Space," Department of Computer Science and Engineering, University of California, p. 550-556, 2002.

(Continued)

*Primary Examiner* — Taelor Kim
(74) *Attorney, Agent, or Firm* — Seyfarth Shaw LLP; Brian Michaels

(57) ABSTRACT

System and methods for rapid generation of attribute driven temporal clustering are provided. In one embodiment, the system includes a data storage device and a server. The data storage device may be configured to store a database comprising a plurality of records. The system may also include a server in data communication with the data storage device. The server may be suitably programmed to receive a first attribute and a second attribute, search a database stored on a data storage device to obtain a first group of records associated with the first attribute, search the first group of records to obtain a second group of records associated with the second attribute, determine a temporal relationship between a first index date of a first attribute and a second index date of the second attribute, and generate an output comprising a graphical representation of the temporal relationship.

24 Claims, 11 Drawing Sheets

(56) References Cited

U.S. PATENT DOCUMENTS

| | | |
|---|---|---|
| 2004/0039264 A1* | 2/2004 | Bardy .......................... 600/300 |
| 2005/0216421 A1 | 9/2005 | Barry et al. .................... 705/64 |
| 2005/0228808 A1 | 10/2005 | Mamou et al. |
| 2006/0015377 A1* | 1/2006 | Hoogs ................. G06Q 10/063 705/7.28 |
| 2006/0085223 A1* | 4/2006 | Anderson et al. ................ 705/2 |
| 2007/0233642 A1 | 10/2007 | Pahno |
| 2008/0004904 A1 | 1/2008 | Tran ................................. 705/2 |
| 2008/0091637 A1* | 4/2008 | Escamilla et al. ................ 707/1 |
| 2008/0183501 A1* | 7/2008 | Beaulieu et al. ................ 705/3 |
| 2008/0270363 A1 | 10/2008 | Hunt et al. |
| 2008/0319786 A1 | 12/2008 | Stivoric ........................... 705/2 |
| 2009/0006132 A1* | 1/2009 | Avinash et al. .................. 705/3 |
| 2009/0016579 A1* | 1/2009 | White et al. .................. 382/128 |
| 2009/0076845 A1* | 3/2009 | Bellin et al. ...................... 705/2 |
| 2009/0238762 A1* | 9/2009 | Totoritis ............. C07K 16/2896 424/9.2 |
| 2012/0265783 A1* | 10/2012 | Kenedy et al. ............... 707/769 |

OTHER PUBLICATIONS

International Preliminary Report on Patentability issued in PCT/US2010/039211, dated Jan. 5, 2012.

European Search Report for Application No. 10790279.3. Mailed Aug. 9, 2016.

* cited by examiner

SYSTEM AND METHOD FOR GENERATION OF ATTRIBUTE DRIVEN TEMPORAL CLUSTERING

CROSS-REFERENCE TO RELATED APPLICATIONS

This application claims priority to U.S. Provisional Application No. 61/218,772 filed Jun. 19, 2009, the entire contents of which is specifically incorporated herein by reference without disclaimer.

BACKGROUND OF THE INVENTION

Field of the Invention

This invention relates to health related data analysis and more particularly relates to a system and method for determination of temporal relationships between a desired attribute and any other attribute.

Description of the Related Art

Most corporations, including health insurance corporations, maintain a high volume of data. Such data may be analyzed and exploited for valuable information regarding business trends, and other important statistics. Data mining is a common strategy for identifying and analyzing such data.

There are many various forms of data mining. Custom analytic operations may be developed to meet specific needs. Alternatively, commercially available statistical analysis tools, such as Statistical Analysis Software (SAS) may be used to identify statistical trends in data.

Health insurance companies typically maintain databases of health insurance claim information, demographic information, and other data about health insurance plan members. Such information may be used to gain valuable insights into early disease diagnosis, relationship between lab tests and diseases or drug treatments, and disease severity. Unfortunately, typical methods for analyzing such data are often cumbersome, costly, and require unworkably high processing times and resources. For example, diseases often have pre-cursors and stages. Discovering these using existing methods requires time-consuming ad-hoc analysis.

The referenced shortcomings are not intended to be exhaustive, but rather are among many that tend to impair the effectiveness of previously known techniques in disease management, diagnosis and treatment; however, those mentioned here are sufficient to demonstrate that the methodologies appearing in the art have not been satisfactory and that a significant need exists for the techniques described and claimed in this disclosure.

SUMMARY OF THE INVENTION

From the foregoing discussion, it should be apparent that a need exists for a system and method to allow the user to select an attribute of interest and quickly determine the temporal relationships between the desired attribute and any other attribute.

A system is presented for rapid generation of attribute driven temporal clustering. In one embodiment, the system includes a data storage device configured to store a database comprising a plurality of records. The system may also include a server in data communication with the data storage device. The server may be suitably programmed to receive a first attribute and a second attribute, search a database stored on a data storage device to obtain a first group of records associated with the first attribute, search the first group of records to obtain a second group of records associated with the second attribute, determine a temporal relationship between the first attribute and the second attribute, and generate an output comprising a graphical representation of the temporal relationship, such as a box plot. The first attribute or second attribute may comprise a medical code, a lab test, a specific stage of disease, a drug treatment, a procedure, etc.

In one embodiment, the server may narrow the first or second group of records according to a selected time window. In a further embodiment, the server may count distinct records in the second group of records. In a still further embodiment, the server may compute a ratio of the number of distinct records in the second group and the number of distinct records in the first group.

In a certain embodiment, the server may normalize the second attribute of records in the second group by an index date associated with the first attribute. The server may also calculate one or more temporal statistics of the second group of records, for example, lower quartile, median, upper quartile, outlier or standard deviation of their temporal clustering. In a particular embodiment, the server may also identify outlier(s) and remove outliers(s) from the second group of records.

A method is also presented for rapid generation of attribute driven temporal clustering. The method in the disclosed embodiments substantially includes the steps necessary to carry out the functions presented above with respect to the operation of the described system. In one embodiment, the method includes receiving a first attribute and a second attribute, searching a database stored on a data storage device to obtain a first group of records associated with the first attribute, searching the first group of records to obtain a second group of records associated with the second attribute, determining a temporal relationship the first attribute and the second attribute, and generating an output comprising a graphical representation of the temporal relationship.

To process records at any temporal interval, the method may further comprise narrowing the first or second group of records according to a selected time window. Such a selected time window may be relative to the time of disease onset, disease progression, lab test, diagnosis, or treatment. Additionally, the method may include counting distinct records in the second group of records. In a still further embodiment, the server may compute a ratio of the number of distinct records in the second group and the number of distinct records in the first group.

In a further embodiment, the method may include normalizing the second attribute of records in the second group by an index date associated with the first attribute. The method may also calculate one or more temporal statistics of the second group of records. In addition, the method may also identify outlier(s) and remove outliers(s) from the second group of records.

There may be also provided a tangible computer program product comprising a computer readable medium having computer usable program code executable to perform operations comprising: receiving a first attribute and a second attribute, searching a database stored on a data storage device to obtain a first group of records associated with the first attribute, searching the first group of records to obtain a second group of records associated with the second attribute, determining a temporal relationship the first attribute and the second attribute, and generating an output comprising a graphical representation of the temporal relationship.

The operations may further include narrowing the first or second group of records according to a selected time window. Moreover, the operations may count distinct records in the second group of records. The operations may also compute a ratio of the number of distinct records in the second group to the number of distinct records in the first group.

In a certain embodiment, the operations may include normalizing the second attribute of records in the second group by an index date associated with the first attribute. The operations may also calculate one or more temporal statistics of the second group of records. Moreover, the method may also identify outlier(s) and remove outliers(s) from the second group of records.

The term "associated" is referred to as connected or related. The term "coupled" is defined as connected, although not necessarily directly, and not necessarily mechanically.

The terms "a" and "an" are defined as one or more unless this disclosure explicitly requires otherwise.

The term "substantially" and its variations are defined as being largely but not necessarily wholly what is specified as understood by one of ordinary skill in the art, and in one non-limiting embodiment "substantially" refers to ranges within 10%, preferably within 5%, more preferably within 1%, and most preferably within 0.5% of what is specified.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements possesses those one or more steps or elements, but is not limited to possessing only those one or more elements. Likewise, a step of a method or an element of a device that "comprises," "has," "includes" or "contains" one or more features possesses those one or more features, but is not limited to possessing only those one or more features. Furthermore, a device or structure that is configured in a certain way is configured in at least that way, but may also be configured in ways that are not listed.

Other features and associated advantages will become apparent with reference to the following detailed description of specific embodiments in connection with the accompanying drawings.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION

Figure 1:
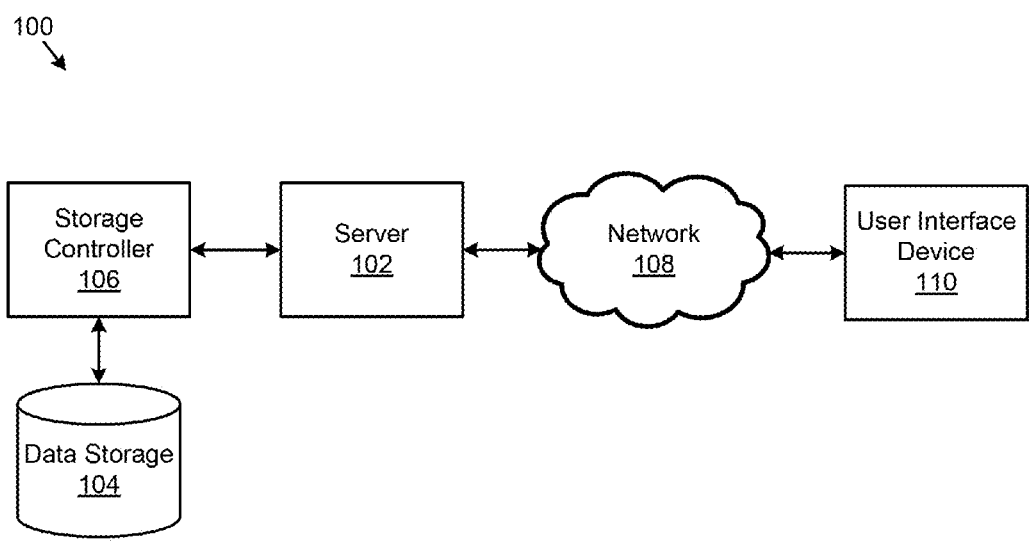
FIG. 1 is a schematic block diagram illustrating one embodiment of a system for rapid generation of attribute driven temporal clustering.

Various features and advantageous details are explained more fully with reference to the non-limiting embodiments that are illustrated in the accompanying drawings and detailed in the following description. Descriptions of well known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure.

Certain units described in this specification have been labeled as modules, in order to more particularly emphasize their implementation independence. A module is "[a] self-contained hardware or software component that interacts with a larger system." Alan Freedman, "The Computer Glossary" 268 (8th ed. 1998). A module comprises a component of a machine, a machine or a plurality of machines that are suitably programmed to operate according to executable instructions. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, a controller, or the like.

Modules may also include software-defined units or instructions that, when executed by a processing machine or device, retrieve and transform data stored on a data storage device from a first state to a second state. An identified module of executable code may, for instance, comprise one or more physical blocks of computer instructions which may be organized as an object, procedure, or function. Nevertheless, the executables of an identified module need not be physically located together, but may comprise disparate instructions stored in different locations which, when joined logically together, comprise the module, and when executed by the processor, achieve the stated data transformation.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

In the following description, numerous specific details are provided, such as examples of programming, software modules, user selections, network transactions, database queries, database structures, hardware modules, hardware circuits, hardware chips, etc., to provide a thorough understanding of the present embodiments. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 illustrates one embodiment of a system 100 for rapid generation of attribute driven temporal clustering. The system 100 may include a server 102, a data storage device 104, a network 108, and a user interface device 110. In a further embodiment, the system 100 may include a storage controller 106, or storage server configured to manage data communications between the data storage device 104, and the server 102 or other components in communication with the network 108. In an alternative embodiment, the storage controller 106 may be coupled to the network 108. In a general embodiment, the system 100 may store databases comprising records, perform searches of those records, and generate outputs in response to information contained in these records. Specifically, the system 100 may receive a first and second attribute, determine a temporal relationship between the two attributes based on a group of records associated with the two attributes, and generate an output representing the temporal relationship.

In one embodiment, the user interface device 110 is referred to broadly and is intended to encompass a suitable processor-based device such as a desktop computer, a laptop computer, a Personal Digital Assistant (PDA), a mobile communication device or organizer device having access to the network 108. In a further embodiment, the user interface device 110 may access the Internet to access a web application or web service hosted by the server 102 and provide a user interface for enabling a user to enter or receive information. For example, the user may enter a first and a second attribute (e.g., a medical code, a test code, a procedure, or a drug treatment), a time interval, a limiting criterion, or the like.

The network 108 may facilitate communications of data between the server 102 and the user interface device 110. The network 108 may include any type of communications network including, but not limited to, a direct PC to PC connection, a local area network (LAN), a wide area network (WAN), a modem to modem connection, the Internet, a combination of the above, or any other communications network now known or later developed within the networking arts which permits two or more computers to communicate, one with another.

In one embodiment, the server 102 is configured to generate a health profile for an individual, retrieve a disease progression map comprising one or more disease progression states from a data storage device, determine a disease progression state associated with the individual in response to the health profile, and display a graphical representation of the disease progression state with reference to the disease progression map. Additionally, the server may access data stored in the data storage device 104 via a Storage Area Network (SAN) connection, a LAN, a data bus, or the like.

The data storage device 104 may include a hard disk, including hard disks arranged in an Redundant Array of Independent Disks (RAID) array, a tape storage drive comprising a magnetic tape data storage device, an optical storage device, or the like. In one embodiment, the data storage device 104 may store health related data, such as insurance claims data, consumer data, or the like. The data may be arranged in a database and accessible through Structured Query Language (SQL) queries, or other data base query languages or operations.

Figure 2:
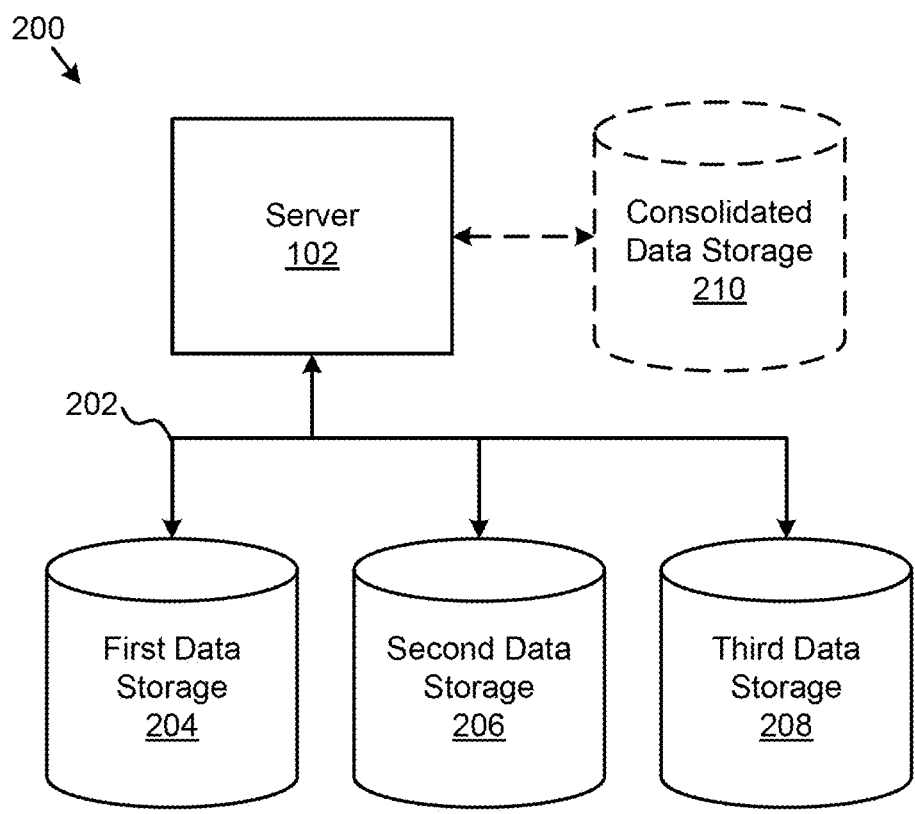
FIG. 2 is a schematic block diagram illustrating one embodiment of a database system for rapid generation of attribute driven temporal clustering.

FIG. 2 illustrates one embodiment of a data management system 200 configured to store and manage data for rapid generation of attribute driven temporal clustering. In one embodiment, the system 200 may include a server 102. The server 102 may be coupled to a data-bus 202. In one embodiment, the system 200 may also include a first data storage device 204, a second data storage device 206 and/or a third data storage device 208. In further embodiments, the system 200 may include additional data storage devices (not shown). In such an embodiment, each data storage device 204-208 may host a separate database of healthcare claim data, lab data, physical test data, disease progression data, demographic data, socioeconomic data, administrative data, clinical data, or the like. The customer information in each database may be keyed to a common field or identifier, such as an individual's name, social security number, customer number, or the like. Alternatively, the storage devices 204-208 may be arranged in a RAID configuration for storing redundant copies of the database or databases through either synchronous or asynchronous redundancy updates.

In one embodiment, the server 102 may submit a query to selected data storage devices 204-208 to collect a consolidated set of data elements associated with an individual or group of individuals. The server 102 may store the consolidated data set in a consolidated data storage device 210. In such an embodiment, the server 102 may refer back to the consolidated data storage device 210 to obtain a set of data elements associated with a specified individual. Alternatively, the server 102 may query each of the data storage devices 204-208 independently or in a distributed query to obtain the set of data elements associated with a specified individual. In another alternative embodiment, multiple databases may be stored on a single consolidated data storage device 210.

In various embodiments, the server 102 may communicate with the data storage devices 204-210 over the data-bus 202. The data-bus 202 may comprise a SAN, a LAN, or the like. The communication infrastructure may include Ethernet, Fibre-Chanel Arbitrated Loop (FC-AL), Small Computer System Interface (SCSI), and/or other similar data communication schemes associated with data storage and communication. For example, the server 102 may communicate indirectly with the data storage devices 204-210; the server may first communicate with a storage server or storage controller 106.

In one example of the system 200, the first data storage device 204 may store data associated with clinical data that may be comprised in insurance claims made by a group of individuals. The clinical data may include data associated with medical services, procedures, and/or prescriptions utilized by the individuals. In one embodiment, the second data storage device 206 may store diagnosis data associated with the individuals. The diagnosis data may include one or more diagnoses of conditions which the individuals suffer from or is at risk of, as well as the ongoing disease stage information. The third data storage device 208 may store lab test data associated with the individual. For example, the third data storage device 208 may include data associated with the individuals' lab test results and/or clinical observations. A fourth data storage device (not shown) may store demographic data. For example, the demographic data may include information relating to the individuals' demographics include gender, race or ethnicity, age, income, disabilities, mobility, educational attainment, home ownership, employment status, location, or the like.

The server 102 may host a software application configured for rapid generation of attribute driven temporal clustering. The software application may further include modules for interfacing with the data storage devices 204-210, interfacing a network 108, interfacing with a user, and the like. In a further embodiment, the server 102 may host an engine, application plug-in, or application programming interface (API). In another embodiment, the server 102 may host a web service or web accessible software application.

Figure 3:
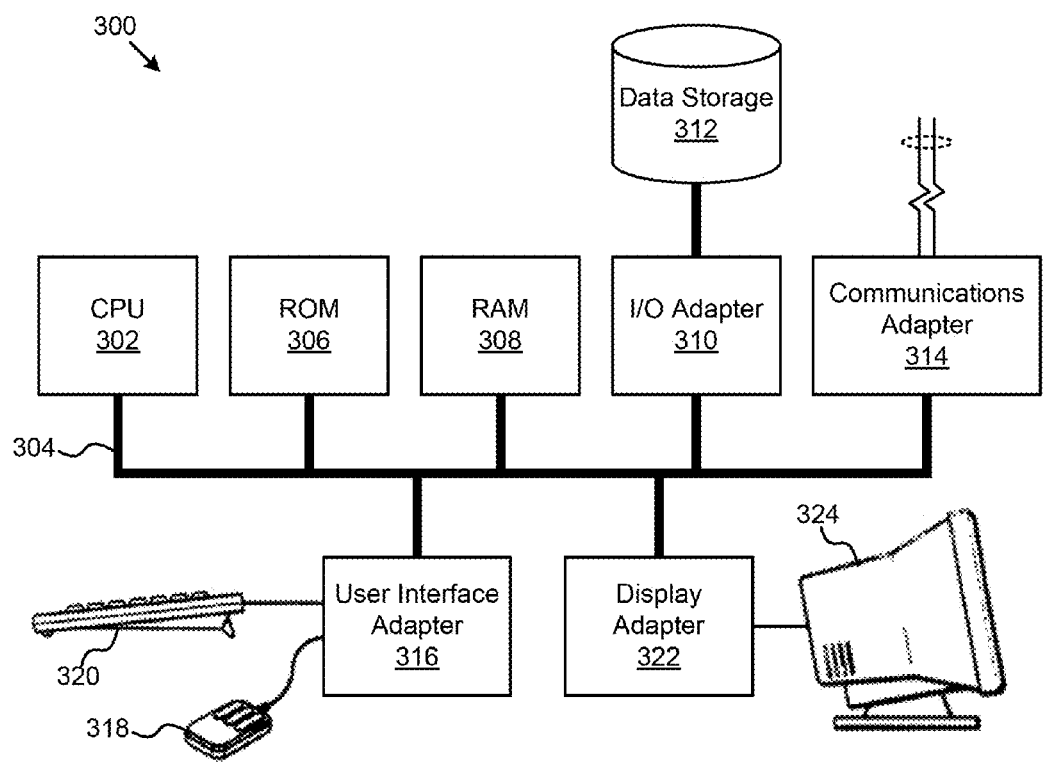
FIG. 3 is a schematic block diagram illustrating one embodiment of a computer system that may be used in accordance with certain embodiments of the system for rapid generation of attribute driven temporal clustering.

FIG. 3 illustrates a computer system 300 adapted according to certain embodiments of the server 102 and/or the user interface device 110. The central processing unit (CPU) 302 is coupled to the system bus 304. The CPU 302 may be a general purpose CPU or microprocessor. CPU 302 is one embodiment of a processing device. The present embodiments are not restricted by the architecture of the CPU 302, so long as the CPU 302 supports the modules and operations as described herein. The CPU 302 may execute the various logical instructions according to the present embodiments. For example, the CPU 302 may execute machine-level instructions according to the exemplary operations described below with reference to FIGS. 7-8.

The computer system 300 also may include Random Access Memory (RAM) 308, which may be SRAM, DRAM, SDRAM, or the like. The computer system 300 may utilize RAM 308 to store the various data structures used by a software application configured to rapid generation of attribute driven temporal clustering. The computer system 300 may also include Read Only Memory (ROM) 306 which may be PROM, EPROM, EEPROM, optical storage, or the like. The ROM may store configuration information for booting the computer system 300. The RAM 308 and the ROM 306 hold user and system 100 data.

The computer system 300 may also include an input/output (I/O) adapter 310, a communications adapter 314, a user interface adapter 316, and a display adapter 322. The I/O adapter 310 and/or user the interface adapter 316 may, in certain embodiments, enable a user to interact with the computer system 300 in order to input information for authenticating a user, identifying an individual or group, receiving health profile information, or entering information like a medical code, a test code, a procedure, a drug, a temporal range, a percentile, or a limiting criterion. In a further embodiment, the display adapter 322 may display a graphical user interface associated with a software or web-based application for determination and representing temporal relationship between attributes.

The I/O adapter 310 may connect to one or more storage devices 312, such as one or more of a hard drive, a Compact Disk (CD) drive, a floppy disk drive, a tape drive, to the computer system 300. The communications adapter 314 may be adapted to couple the computer system 300 to the network 106, which may be one or more of a LAN and/or WAN, and/or the Internet. The user interface adapter 316 couples user input devices, such as a keyboard 320 and a pointing device 318, to the computer system 300. The display adapter 322 may be driven by the CPU 302 to control the display on the display device 324.

The present embodiments are not limited to the architecture of system 300. Rather the computer system 300 is provided as an example of one type of computing device that may be adapted to perform the functions of a server 102 and/or the user interface device 110. For example, any suitable processor-based device may be utilized including without limitation, including personal data assistants (PDAs), computer game consoles, and multi-processor servers. Moreover, the present embodiments may be implemented on other processing devices such as for example, application specific integrated circuits (ASIC) or very large scale integrated (VLSI) circuits. In fact, persons of ordinary skill in the art may utilize any number of suitable structures capable of executing logical operations according to the described embodiments.

Figure 4:
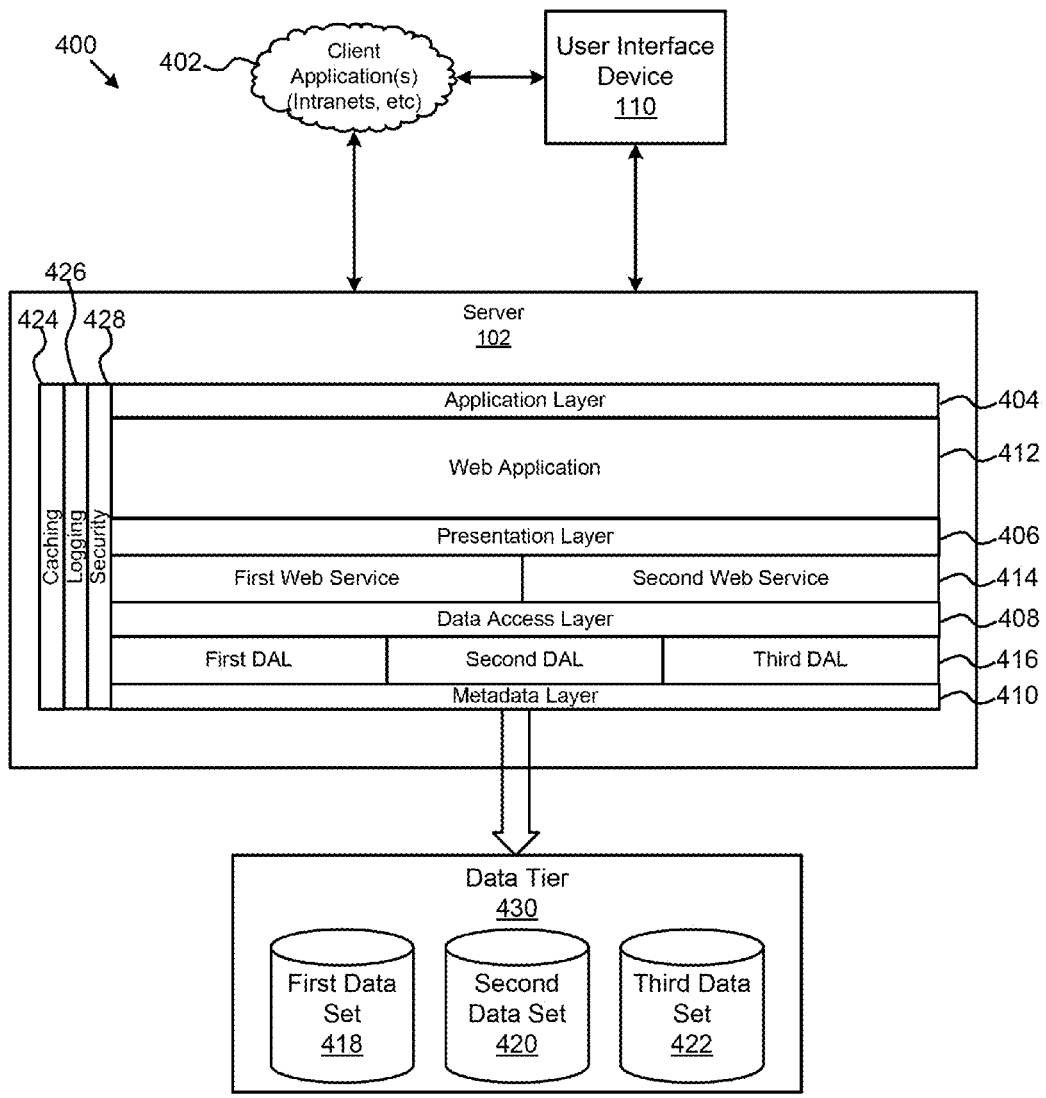
FIG. 4 is a schematic logical diagram illustrating one embodiment of abstraction layers of operation in a system for rapid generation of attribute driven temporal clustering.

FIG. 4 illustrates one embodiment of a network-based system 400 for rapid generation of attribute driven temporal clustering. In one embodiment, the network-based system 400 includes a server 102. Additionally, the network-based system 400 may include a user interface device 110. In still a further embodiment, the network-based system 400 may include one or more network-based client applications 402 configured to be operated over a network 108 including an intranet, the Internet, or the like. In still another embodiment, the network-based system 400 may include one or more data storage devices 104.

The network-based system 400 may include components or devices configured to operate in various network layers. For example, the server 102 may include modules configured to work within an application layer 404, a presentation layer 406, a data access layer 408 and a metadata layer 410. In a further embodiment, the server 102 may access one or more data sets 418-422 that comprise a data layer or data tier 412. For example, a first data set 418, a second data set 420 and a third data set 422 may comprise a data tier 430 that is stored on one or more data storage devices 204-210.

One or more web applications 412 may operate in the application layer 404. For example, a user may interact with the web application 412 though one or more I/O interfaces 318 and 320 configured to interface with the web application 412 through an I/O adapter 310 that operates on the application layer. In one particular embodiment, a web application 412 may be provided for rapid generation of attribute driven temporal clustering that includes software modules configured to perform the steps of includes receiving a first attribute and a second attribute, searching a database stored on a data storage device to obtain a first group of records associated with the first attribute, searching the first group of records to obtain a second group of records associated with the second attribute, determining a temporal relationship the first attribute and the second attribute, and generating an output comprising a graphical representation of the temporal relationship.

In a further embodiment, the server 102 may include components, devices, hardware modules, or software modules configured to operate in the presentation layer 406 to support one or more web services 414. For example, a web application 412 may access or provide access to a web service 414 to perform one or more web-based functions for the web application 412. In one embodiment, a web application 412 may operate on a first server 102 and access one or more web services 414 hosted on a second server (not shown) during operation.

For example, a web application 412 for identifying temporal relationship among records and/or data, or other information may access a first web service 414 for identifying records of a first group of records associated with a first attribute such as a diagnostic code and a second web service 414 for identifying a second group of records within the first group of records, wherein the second groups of records are also associated with a second attribute, such as a drug treatment, a lab test code, or a different diagnosis code. The web service 414 may receive a diagnosis code and a different attribute. In response, the web service 414 may return data associated with individuals having the diagnosis code, statistics, distributions, graphs, or the like. One of ordinary skill in the art will recognize various web-based architectures employing web service 414 for modular operation of a web application 412.

In one embodiment, a web application 412 or web service 414 may access one or more of the data sets 418-422 through the data access layer 408. In certain embodiments, the data access layer 408 may be divided into one or more independent data access layers (DAL) 416 for accessing individual data sets 418-422 in the data tier 412. These individual data access layers 416 may be referred to as data sockets or adapters. The data access layers 416 may utilize metadata from the metadata layer 410 to provide the web application 412 or the web service 414 with specific access to the data set 412.

For example, the data access layer 416 may include operations for performing a query of the data sets 418-422 to retrieve specific information for the web application 412 or the web service 414. In a more specific example, the data access layer 416 may include a query for records associated with individuals diagnosed with a particular disease, or associated with a diagnosis code.

Figure 5:
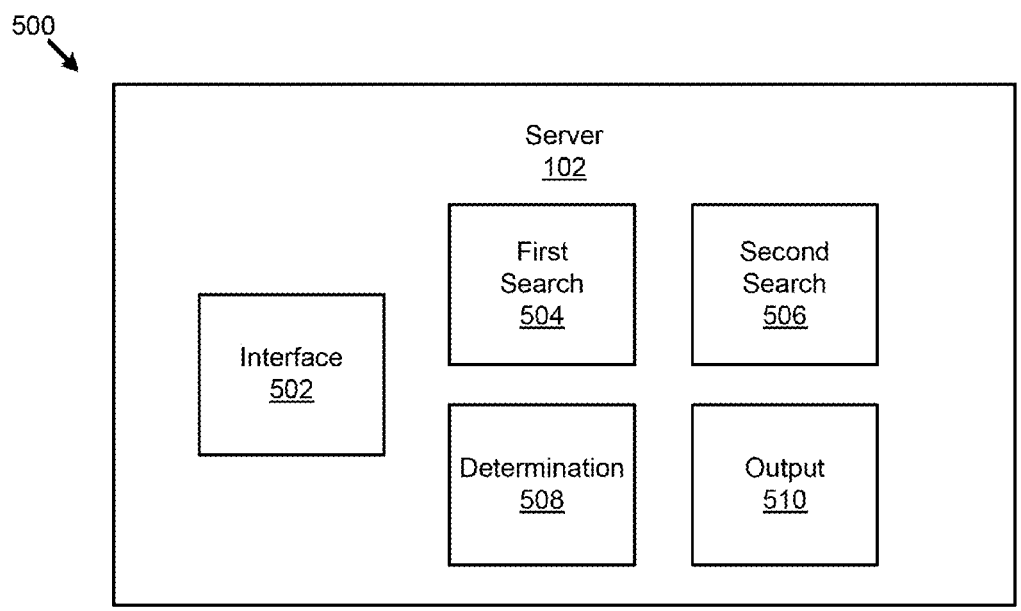
FIG. 5 is a schematic block diagram illustrating one embodiment of a system for a system for rapid generation of attribute driven temporal clustering.

FIG. 5 illustrates a certain embodiment of a system 500 for rapid generation of attribute driven temporal clustering. In one embodiment, the system 500 may include a server 102 configured to load and operate software modules 502-510 configured for analysis of temporal relationships between different attributes. Alternatively, the system 500 may include hardware modules 502-510 configured with analogue or digital logic, firmware executing FPGAs, or the like. These modules 502-208 may be configured to receive a first attribute and a second attribute, search one or more datasets 418-422 stored on a data storage device 204-210 to obtain a first group of records associated with the first attribute, search the first group of records to obtain a second group of records associated with the second attribute, determine a temporal relationship the first attribute and the second attribute, and generate an output comprising a graphical representation of the temporal relationship. In such embodiments, the system 500 may include an interface 502, a first search module 504, a second search module 506, a determination module 508 for temporal analysis, and an output module 510.

A record may comprise an individual associated with values representing a first attribute and a second attribute. In certain embodiment, the first or second attribute could be a diagnosis code, a test code, a procedure, a disease stage, a drug treatment schedule, or a combination thereof.

For example, the diagnosis code may include a diagnosis code used to group and identify diseases, disorders, symptoms, or medical signs and stored in a database of healthcare insurance information, a diagnosis code indicative of a risk of developing a pathologic or disease condition, or a diagnosis code identifying a treatment or a procedure. In a specific embodiment, the first search operation may identify a first group of individuals having records that include a specified ICD-9 diagnosis code. For example, the first search may identify a first group of records in the database associated with individuals that have been diagnosed with diabetes. In another embodiment, the diagnosis code may represent a risk, such as a metabolic syndrome, which is characterized by a group of metabolic risk factors or a combination of medical disorders that increase the risk of developing cardiovascular disease and diabetes. In a further embodiment, the diagnosis code may include an identification or classification of individuals after treatment with one or more drugs or procedures for post-treatment or post-procedure diagnosis.

In an exemplary embodiment, the test code may be a code or classification for identifying a laboratory test or a clinical test or observation, such as a LOINC® code (Logical Observations Identifiers, Names, Codes), a universal code system for reporting laboratory and other clinical observations. For each observation, the database may include a code (of which 25000 are laboratory test observations), a long formal name, a "short" 30-character name, and synonyms. It was identified by the Health Level Seven (HL7) Standards Development Organization as a preferred code set for laboratory test names in transactions between health care facilities, laboratories, laboratory testing devices, and public health authorities. A record may comprise multiple lab test values identified by a common test code, wherein an average, first reading or last reading, or the like of the multiple values can be used to represent a data point for this record.

The first attribute and the second attribute may, in certain circumstances, include a plurality of index attributes. This may be referred to as an "index signature." For example, it may be helpful for a user of the present apparatus, system, and method, to identify occurrences of a particular combination of diagnoses, events, characteristics, or the like. In such an example, a physician may desire to know the number of males over the age of 40 who have both diabetes and renal failure. Thus, the first index attribute in this example may include the diagnosis code for diabetes, as well as a diagnosis code for renal failure, an age attribute having a value over '40,' and a gender attribute having a value of 'male.' Similarly, the second index attribute may include a combination of a plurality of attributes, field values, characteristics, or variables.

In a further example, the first and second index attributes may include a temporal component. For example, the first index attribute may include a temporal difference between two attributes. In such an embodiment, the occurrence of the first attribute may be separated from the occurrence of the second attribute by a time frame. In such an example, the second group of records may include all diabetic patients with a retinopathy (a procedure) within 1 year of diabetic onset (which could be either an ICD9 code or a lab reading or both), who may be also associated with another set of attribute of interest with a time frame relative to the first retinopathy procedure. The time frame can be subtracted for normalization of the desired attribute(s) (for example, the second attribute) relative to a reference attribute (for example, the first attribute).

Generally, the interface module 502 may receive user inputs and display user outputs. For example, the interface module 502 may receive a diagnosis code and a test code. The interface module may further receive a temporal interval, limiting criterion, percentile, and/or other user inputs. In a further embodiment, the interface module 502 may display temporal relationship determined by the modules 504-510. Such analysis results may include statistics, tables, charts, graphs, recommendations, and the like.

Structurally, the interface module 502 may include one or more of an I/O adapter 310, a communications adapter 314, a user interface adapter 316, and/or a display adapter 322. The interface module 502 may further include I/O ports, pins, pads, wires, busses, and the like for facilitating communications between the CPU 302 and the various adapters and interface components 310-324. The interface module may also include software defined components for interfacing with other software modules on the server 102.

In a specific embodiment, the server 102 may load and execute computer software configured to generate, retrieve, send, or otherwise operate SQL instructions. For example, the first search module 504 may communicate a first SQL query to the data storage device 104 or 204-210, which may be configured to search the database for a first group of records associated with a first attribute. Specifically, the first search module 504 may generate a first search query configured to retrieve for a first group of records within a selected temporal interval, while matching the first attribute such as a test code or a medical code. In a further embodiment, the first group of records may include a temporal component, which may specify a time period before, during, or after an event (which may be associated with a second attribute), such as a diagnosis, a disease or disorder or onset, a procedure, or a drug treatment. In a particular aspect, the first group of records may be from within a clean period or disease-free period before the individuals are diagnosed with a disease or a disorder, for example, from within about 30, 60, 120, or 180 days before a diabetic diagnosis.

The second search module 506 may generate and/or communicate a second SQL query to the database in response to the results of the first SQL query. The second query may be configured to search the first group of records for a second group of records, each record in the second group of records associated with a second attribute. The second group of records may be further filtered by a limiting criterion, such as a field value that indicates certain specified characteristics of the individuals associated with the records, such as age, gender, lab tests, lab results, other diseases or diagnoses, use of medication, and the like. In a certain embodiment, the second group of records may also have a temporal component or are associated with a temporal interval of interest, for example, each record in the second group may be associated with individuals having at least three years of records in the database.

By way of a non-limiting example, the first search module 504 may identify a first group of records associated with individuals that have been diagnosed with diabetes or some other illness based on an ICD-9 diagnosis code. The second search module 506 may then search for a second group of records, which is a sub-group of the first group of records identified by the first search. The second group of records are associated with diabetes, and also a second attribute, such as one or more lab tests represented by test codes, procedures, or drug treatments.

In another embodiment, the second search module 506 may generate a second group of records associated with a second attribute, such as one or more test codes; or a group of filtered records associated with a selected limiting criterion and a second attribute, which can be created during or after the first search, or dynamically at run time applying any desired limiting criterion, such as age or gender.

In a further embodiment, the first search module 504 and the second search module 506 may be integrated into a single search module. Specifically, a single set of SQL instructions may be used to both identify the first group of records and identify the second group of records. The benefits of this embodiment may include reduced system overhead, reduced search and analysis time, reduced labor for configuration and generation of queries, etc. For example, with a single integrated SQL query, a user may be able to obtain results for analysis in far less time than the user might otherwise expect. Such an embodiment may not require separate analysis and generation of separate queries for the first group and the second group. Consequently, a significant time savings may be realized.

In one embodiment, the determination module 508 may determine a temporal relationship between the first attribute and second attribute. In order to do so, the determination module 508 may calculate a ratio of the number of distinct records in the second group and the number of distinct records in the first group and/or one or more temporal statistics of the second group of records. For example, the determination module 508 may include analogue or digital logic, firmware, or software configured to carry out one or more determinations according to one or more predefined logic functions. In a further embodiment, the server 102 may include a software defined determination module 508 configured to perform analysis and comparison of the information and data retrieved from the database for the first group of records and the associated second group of records.

In a specific embodiment, the first search module 504 and the second search module 506 may feed retrieved data into a spreadsheet configured to perform one or more calculations on the data by the determination module 508. For example an Excel® spreadsheet may include one or more embedded functions or operations configured to calculate temporal statistics such as frequency, percentile of clustering (such as median, $32^{nd}$ percentile, $68^{th}$ percentile, $5^{th}$ percentile, $95^{th}$ percentile, or the like), tightness (the smallest time difference between two interpolated percentiles), averages, odds ratios and other probabilities, counts, summations, and the like. The data may be automatically imported into a spreadsheet using a macro, a software-based script, or the like. In an alternative embodiment, the determination module 508 may include hard-coded or dynamically variable software functions for calculating such statistics and generating results for a user. In a further embodiment, the determination module 508 may also create outputs such as statistics, tables, charts, graphs, recommendations, and the like, and particularly rank the outputs of different second attributes by tightness.

Figure 6:
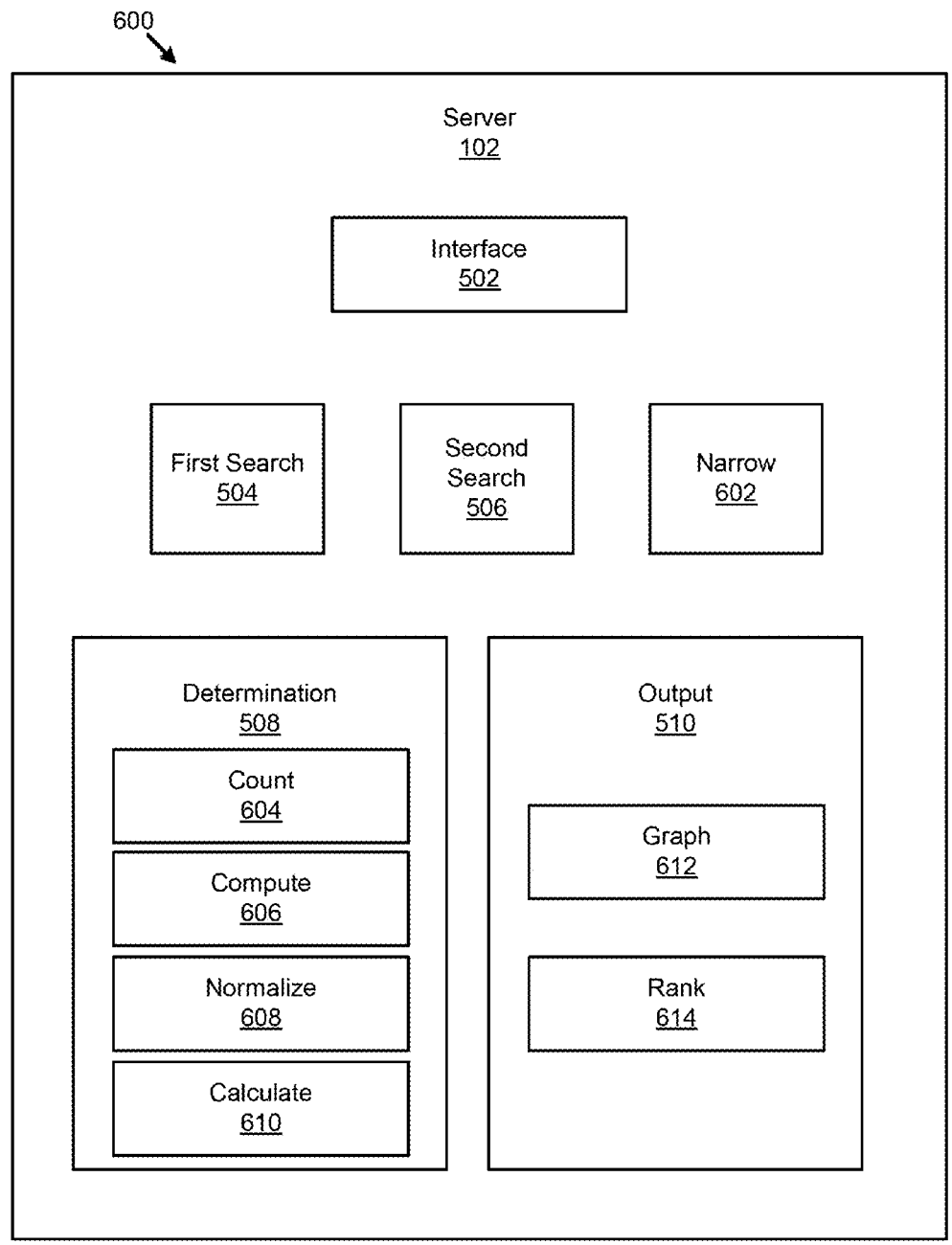
FIG. 6 is a schematic block diagram illustrating one embodiment of a system for a system for rapid generation of attribute driven temporal clustering.

FIG. 6 illustrates a further embodiment of a system 600 for rapid generation of attribute driven temporal clustering. The system 600 may include a server 102 as described in FIG. 5. In a further embodiment, the server 102 may include additional software defined modules. For example, the server 102 may include a narrow module 602. The determination module 508 may further include an count module 604, a compute module 606, a normalize module 608 and a calculate module 610. The output module 510 may further comprise a graph module 612 and a rank module 614.

In a further embodiment, the narrow module 602 may filter the first group or second group of records according to a limiting criterion. The narrow module 602 may filter the first or second group of records by restricting search parameters before the first or second search is performed. Alternatively, the narrow module 602 may filter, remove, or otherwise delete the search results according to the limiting criterion. In a certain embodiment, multiple limiting criteria may be used to restrict the scope of the returned search results. In one embodiment, a limiting criterion may include a field value, such as record date, age, gender, or the like.

In an alternative embodiment, an SQL command generated by the server 102 or stored in RAM 308 or on the data storage device 312 may include instructions, that when executed by a storage controller 104 or the CPU 302 on the server 102, may perform a search for records matching the limiting criterion before or in combination with the first or second search. In a specific embodiment, an SQL operation embedded with the first or second search may activate the narrow module 602.

In one embodiment, the determination module 508 may include a count module 604 configured to count distinct records in the first group of records and the second group of records. The counting function may be implemented using a hardware-based counter. Alternatively, the counting function may be implemented in a software. In a specific embodiment, the server 102 or CPU 302 may execute SQL instructions configured to provide the record count in response to search or query results. In such an embodiment, the counting function may be integrated with the search and filter instructions into a single set of SQL commands or instructions. In a further embodiment, the determination module 508 may also include a compute module 606 to compute a ratio of the number of the second group of records relative to the number of the first group of records. The ratio may represent the relevance or significance of the second attribute to the first attribute, for example, the frequency of a procedure (the second attribute) that may surround a heart attack (the first attribute).

In a certain embodiment, the determination module 508 may also include a calculate module 610 configured to calculate temporal statistics, such as deriving one or more selected percentile values from the second group of records for temporal clustering. The percentile may be any one ranging from 1% to 99%, such as a median, 5%, 32%, 68%, or 95%, etc. The calculate module 610 may involve an interpolation function by fitting a function to the data comprised in the records and evaluating that function at the desired point, or calculating the interpolated data by statistical methods. For example, interpolation methods may include a linear interpolation, a piecewise constant interpolation, a polynomial interpolation, a spline interpolation, or a non-linear interpolation such as an interpolation via Gaussian processes. In a specific embodiment, an SQL command may be generated by the serve 102 or the calculate module 610 for calculating a percentile value from the second group of records.

In a further embodiment, the ratios or temporal statistics generated by the determination module 508 may be further processed by an output module comprising a graph module 612 and optionally a rank module 614. For example, such a graph module 612 may generate, format, and/or provide a graphical representation of the ratios and/or statistics, such as a box plot. One or more temporal statistics may be selected to represent the temporal relationship between the second attribute and the first attribute, for example, tightness. The second attributes can include a group of different attributes and the rank module 614 may compare different temporal relationships between the attributes within the group and the same first attribute in response to the information generated by the determination module 508.

These modules 604-614 may be stand-alone modules implemented in hardware, firmware, or software. Alternatively, the functions may be accomplished through commercial calculation products or spreadsheets, software or SQL instructions that are integrated with the other functions of the server 102. In a specific embodiment, the determination module 508, including some or all of its component modules 604-610, may communicate the statistics with the interface module 502 for display or communication to a user.

Although the various functions of the server 102 and the CPU or processor 302 are described in the context of modules, the methods, processes, and software described herein are not limited to a modular structure. Rather, some or all of the functions described in relation to the modules of FIGS. 5-6 may be implemented in various formats including, but not limited to, a single set of integrated instructions, commands, code, queries, etc. In one embodiment, the functions may be implemented in database query instructions, including SQL, PLSQL, or the like. Alternatively, the functions may be implemented in software coded in C, C++, C#, php, Java, or the like. In still another embodiment, the functions may be implemented in web based instructions, including HTML, XML, etc.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 7:
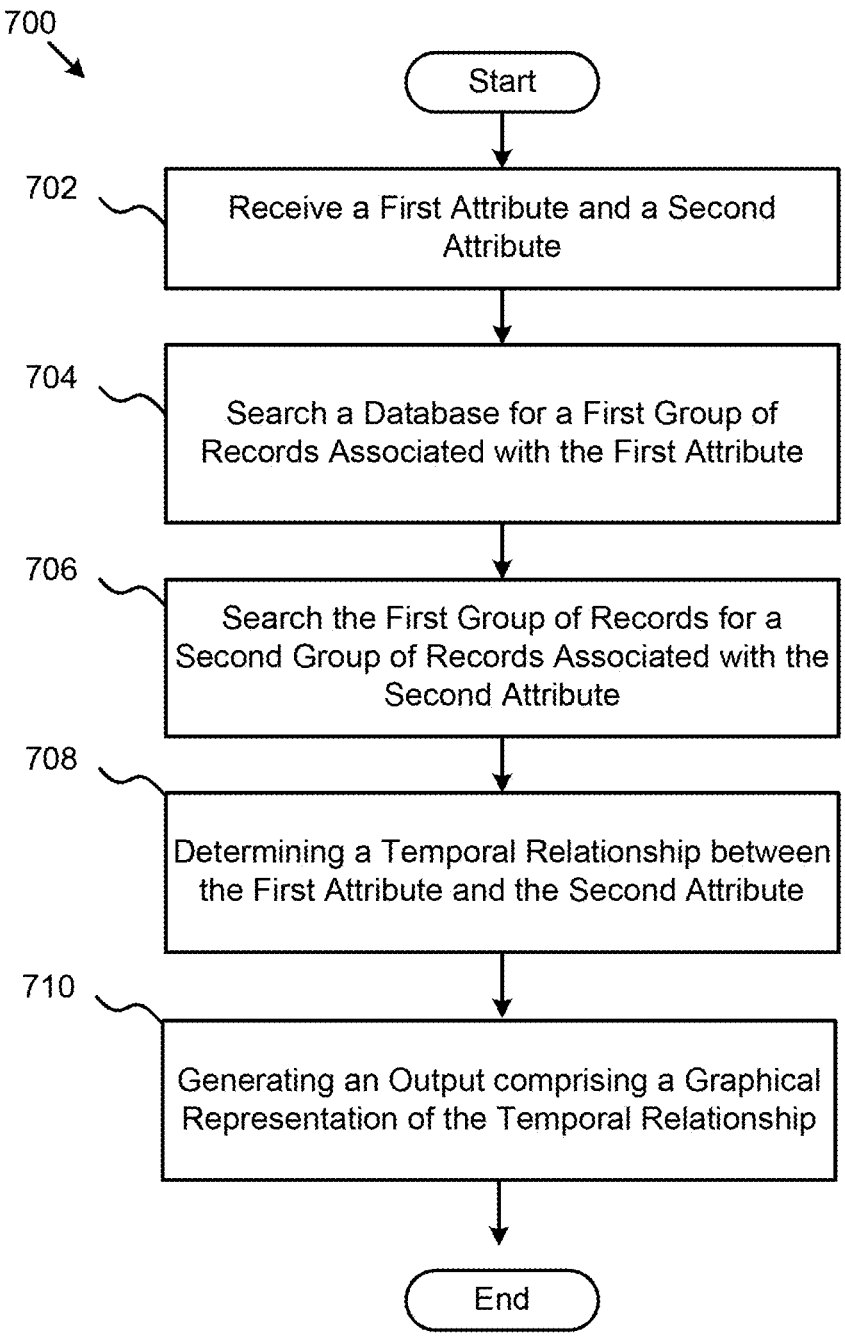
FIG. 7 is a schematic block diagram illustrating one embodiment of a method for rapid generation of attribute driven temporal clustering.

FIG. 7 illustrates one embodiment of a method 700 for rapid generation of attribute driven temporal clustering. In one embodiment, the method 700 starts when the interface module 502 receives 702 a first attribute and a second attribute. The method 700 may continue when the server 102 issues a command to search 704 a database stored on the data storage device 104 for a first group of records. The first group of records may be associated with the first attribute. For example, the server 102 may send an SQL query to the database to retrieve healthcare records associated with individuals that have been diagnosed with diabetes as indicated by the presence of an ICD-9 code associated with diagnosis of diabetes in the individual's records.

The server 102 may then issue a command to search 706 the first group of records for a second group of records associated with the second attribute. Each record in the second group of records may share the second attribute, such as procedure(s), drug(s), lab result(s), and also share the first attribute, for example, associated with the specific diagnosis code or any attribute different from the second attribute. For example, SQL query issued by the server 102 may also include a query statement to search for a second group of records which are associated with the group of individuals identified by the same diagnosis code as the first attribute, and are associated with the same second attribute, like a drug or procedure.

Alternatively, the server 102 may issue a command to search 706 the database for the first group of records associated with the first attribute, search the database for the third group of records associated with the second attribute, and consolidate the first group of records and the third group of records to obtain a second group of records that are associated with individuals having both the first and second attribute. The second group of records may be further processed by steps 708-710 as described below.

The sever 102 may receive the results form the searches 704 and 706. The determination module 508 may then determine 708 a temporal relationship between the first attribute and the second attribute in response to information of the second group of records. The temporal relationship may include one or more temporal statistics, such as averages, ratios, percentiles, outliers, and other computational products including identification of temporal relevance among the records. The output module 510 may then be used to generate 710 an output comprising a graphical representation of the temporal relationship.

Figure 8:
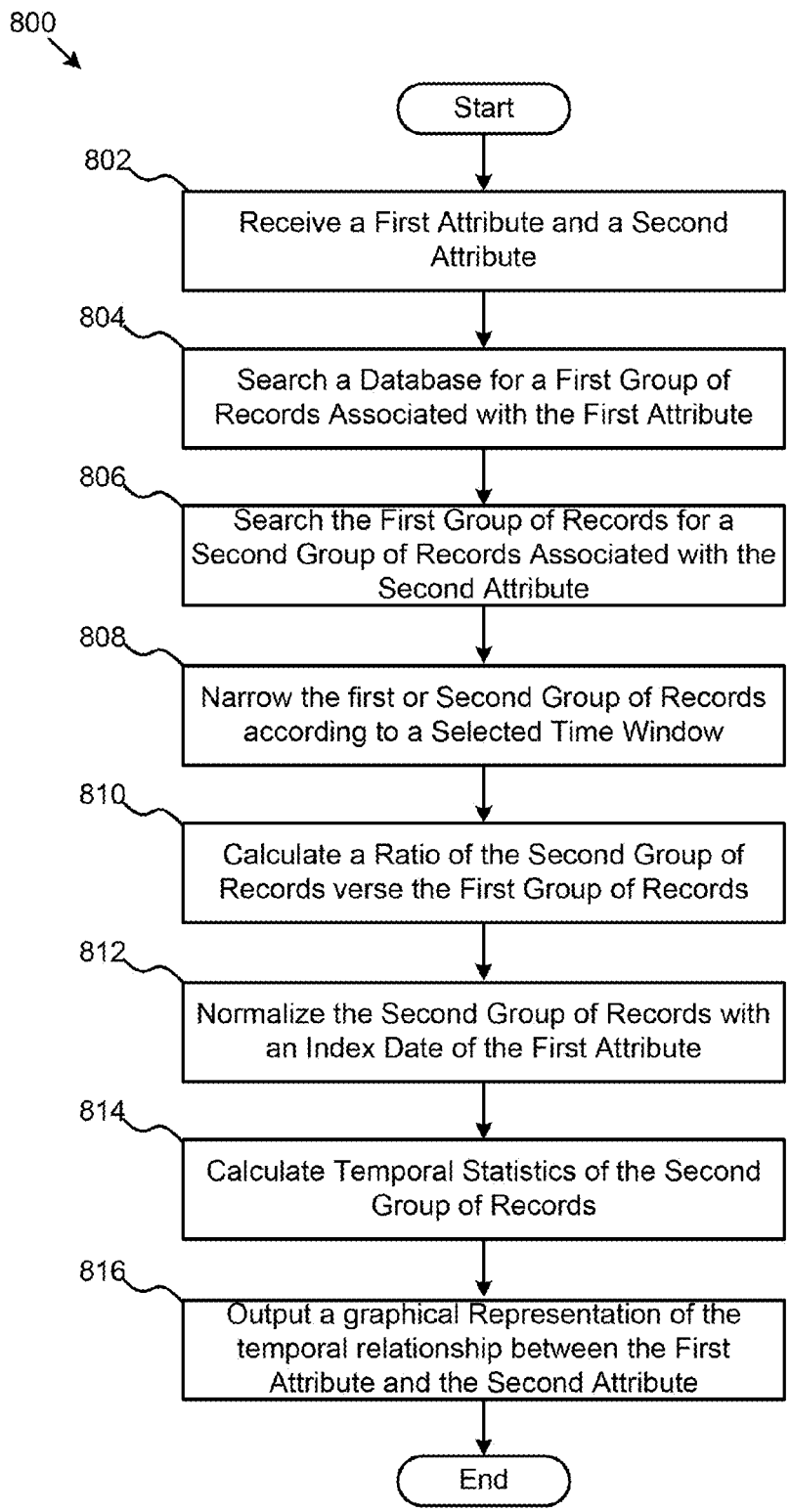
FIG. 8 is a schematic block diagram illustrating one embodiment of a method for rapid generation of attribute driven temporal clustering.

FIG. 8 illustrates another embodiment of a method 800 for rapid generation of attribute driven temporal clustering. In one embodiment, the method 800 starts when the interface module 502 receives 802 indicants of a first attribute, a second attribute, and optionally one or more limiting criteria. For example, the interface module 502 may include a graphical user interface. The interface module 502 may receive user inputs consisting of identifiers or indicants of the first attribute and the second attribute. Such indicants may include a selection of a field value, such as an ICD-9 code value, a drug, a procedure, a lab test, an age value, a gender value, or the like.

The limiting criterion may include windowing values to limit or restrict the time frames which records will be searched, restrictions on minimal enrollment, minimum number of records, gender restrictions, age restrictions, weight restrictions, physical conditions, healthcare patterns, other diagnoses or identified lab values, and other similar threshold and limiting values.

The narrow module 602 may incorporate 808 the limiting criterion such as a selected time window into a query used to filter the records by the limiting criterion before, during or after the search 804 or the search 806. For example, the query may search for all records associated with individuals that have been diagnosed with diabetes, but the query may be restricted to return only results associated with individuals that have at least two years worth of records in the database. For example, specific time interval relative to the diagnosis associated with a diagnosis code may be also used to filter records to assess the temporal relationship between the diagnosis code and one or more other attributes.

For the determination module 508, the count module 604 and the compute module 606 may calculate 810 a ratio of the second group of records verse the first group of records, which may represent the probability of the occurrence of the second attribute when the first attribute exist. The normalize module 608 may normalize the second group of records with an index date of the first attribute, for example, by subtracting the occurrence time of the first attribute from the occurrence time of the second attribute within an individual record and processing each record of the second group of records by this approach. The calculate module 610 may then use the normalized temporal values associated with the second attribute in each record to calculate one or more temporal statistics of the second group of records, therefore identifying the temporal relationship between the first and second attributes. Outliers may be identified and excluded by conventional statistical methods. The graph module 612 may then generate one or more graphically display for one or more statistics or ratios calculated by the determination module 508.

In a specific example, the server 102 may send a single set of SQL instruction to perform the first search 804, perform the second search 806, and other searching functions, such as narrowing function 808.

In a further embodiment, the SQL instructions may include instructions for determining 814 temporal statistics of the second group of records. In a still further embodiment, the SQL instructions may also include generating 816 an output comprising a graph showing the temporal relationship, for example, in the format of a box plot showing the selected percentiles. An optional step (not shown) of the method 800 may comprise ranking the second attributes by temporal statistics, such as tightness if there are more than one second attributes. For example, one embodiment of SQL instructions that may be used to perform the method 800 may include:

```
select *,interpolated68th-interpolated32th
tightness,cast(count_distinct as float)/tot1 percent from
(
select   decm_code,code_desc,tot1,count_distinct
,max(case when .50 between decile and lead_decile then
(lead_delta-delta_from_index)/(lead_decile-decile)*0.50
+(delta_from_index-(lead_delta-delta_from_index)/(lead_decile-
decile)*decile)    else -99999 end ) interpolated50th
,max(case when .32 between decile and lead_decile then
(lead_delta-delta_from_index)/(lead_decile-decile)*0.32
+(delta_from_index-(lead_delta-delta_from_index)/(lead_decile-
decile)*decile)    else -99999 end ) interpolated32th
,max(case when .95 between decile and lead_decile then
(lead_delta-delta_from_index)/(lead_decile-decile)*0.95
+(delta_from_index-(lead_delta-delta_from_index)/(lead_decile-
decile)*decile)    else -99999 end ) interpolated95th
,max(case when .05 between decile and lead_decile then
(lead_delta-delta_from_index)/(lead_decile-decile)*0.05
+(delta_from_index-(lead_delta-delta_from_index)/(lead_decile-
decile)*decile) else -99999 end ) interpolated5th
,max(case when .68 between decile and lead_decile then
(lead_delta-delta_from_index)/(lead_decile-decile)*0.68
+(delta_from_index-(lead_delta-delta_from_index)/(lead_decile-
decile)*decile)    else -99999 end ) interpolated68th
from
(
select decm_code,code_desc,tot1,count_distinct,rn,cast(rn as
float)/count_distinct decile,delta_from_index
,lead(cast(rn as float)/count_distinct) over (partition by
decm_code,code_desc order by rn) lead_decile
,lead(delta_from_index) over (partition by decm_code,code_desc
order by rn) lead_delta
from
(
select decm_code,code_desc,tot1,twin_set,dx_onset-min_dos
delta_from_index
, row_number( ) over (partition by
decm_code,code_desc,tot1,twin_set order by delta_from_index) rn
, count(1) over (partition by decm_code,code_desc,tot1,twin_set)
count_distinct
from
(
select a1.decm_code,'('||a1.decm_code||')'||a1.code_desc
code_desc,tot1, 'Primary' twin_set,min_dos
,id_primary,min(service_from_date) dx_onset
   from
(
select iv_primary.individual_id id_primary,min_dos, count(1) over
(partition by 1) tot1 from
(
select *,row_number( ) over (partition by
age_at_onset,year_of_onset,gender order by year_of_onset)
rn_inplay from
(
select iv.individual_id,c.gender,min_dos,trunc((min_dos-
date_of_birth)/365.24) age_at_onset,to_char(min_dos,'yyyy')+0
```

-continued

```
year_of_onset from
(
select individual_id,min(service_from_date) min_dos from
diagnosis a, foo_members_with_condition6 b where decm_code
like'284.8%' and b.dx=a.diagnosis_key group by individual_id
) iv ,
        foo_2yr_ce_medcohorts3 c
WHERE iv.individual_id=c.individual_id
        AND min_dos BETWEEN med_start    AND med_end AND
med_end >= min_dos+ 365
    AND min_dos-med_start>=365
    ) iv
    ) iv_primary
    ) iv, diagnosis a1,        foo_members_with_condition6 b1
where (b1.individual_id=id_primary ) and b1.dx=a1.diagnosis_key
and service_from_date-min_dos between -365 and 365
group by
a1.decm_code,'('||a1.decm_code||')'||a1.code_desc,tot1,twin_set,min
_dos,id_primary
) iv7
) iv8
) iv9
where count_distinct >19 and code_desc not like
'%UNKNOWN%DIAGNOSIS%'
group by decm_code,code_desc,tot1,count_distinct
having count_distinct >19
) iv10 order by tightness asc
```

Figure 9:
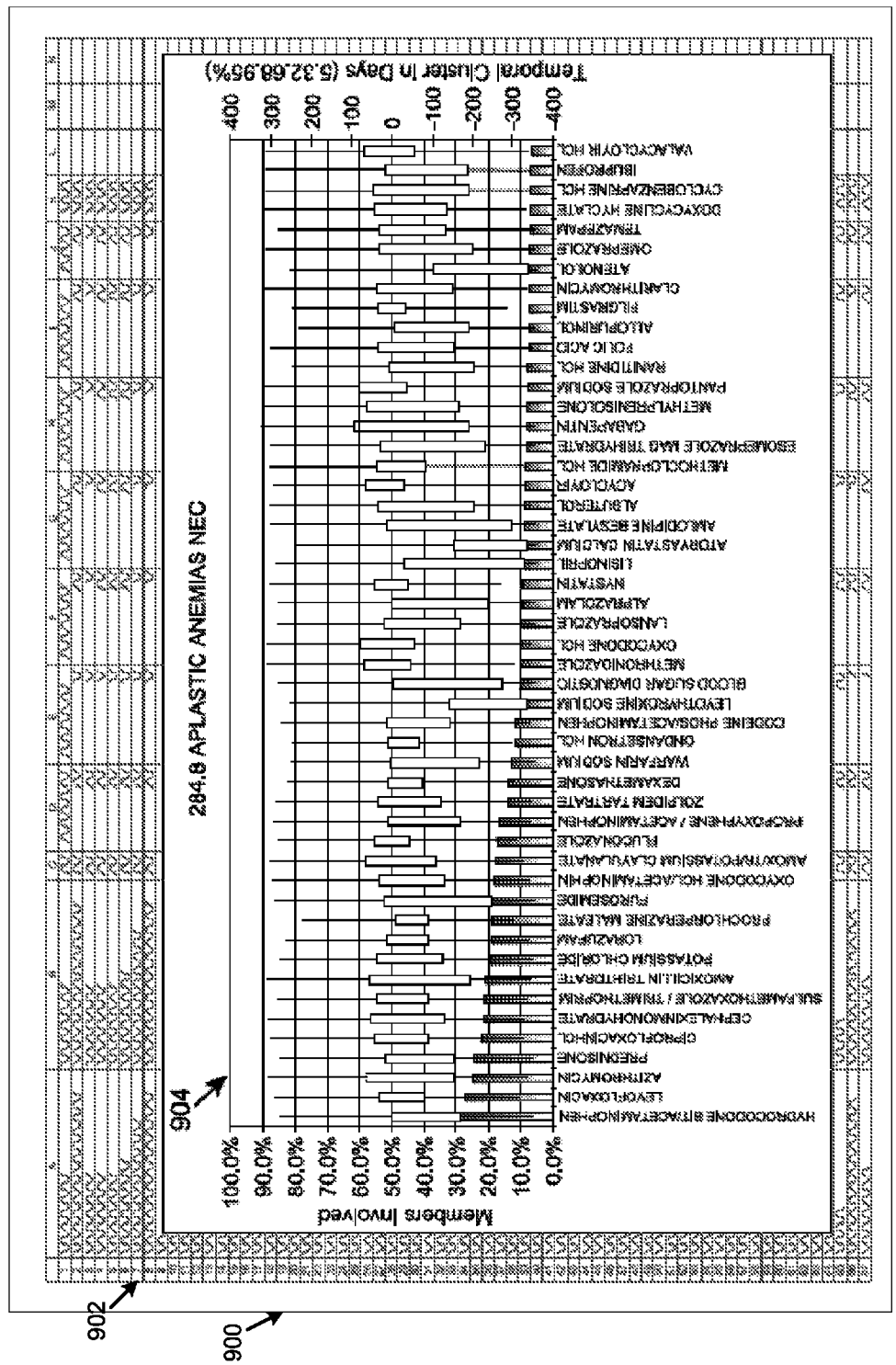
FIG. 9 is an output illustrating one embodiment of graphical representation generated by rapid generation of attribute driven temporal clustering.

FIG. 9 illustrates one embodiment of a graphical output 900 including a table 902 and a graph 904. In one embodiment, the temporal statistics or ratios determined by the present methods may be formatted into a graphical presentation, such as a table, a plot, a graph, or the like. In this embodiment, a first group of records may be collected for individuals having been diagnosed with aplastic anemia (with a diagnosis code 284.8; the first attribute). The second group of records may be collected for individuals having been diagnosed with the diagnosis code 284.8 and also having been treated with various drugs (the second attributes). For example, after subtracting the index date of the aplastic anemia from the first occurrence of each of the drug treatment associated with each record to obtain a group of temporal values for each drug, the present methods or systems may calculate temporal statistics within each drug group such as desired temporal percentiles, and may output the results as the table 902 and/or the graph 904.

For example, the table 902 displays the selected temporal statistics for each drugs, such as count of distinct records, interpolated percentiles ($50^{th}$, $32^{nd}$, $95^{th}$, $5^s$) of normalized temporal values associated with each drug, tightness, and percent (ratio of those receiving the specific drug compared with the total number of the individuals diagnosed with the code).

As illustrated, the graph 904 includes a graphical display representing the temporal relationship between various drugs and the diagnosis code 284.8 with an x-axis representing various drugs and two different y-axis. One part of the graph 904 (including the bar graphs with percentage values corresponding to the left y-axis) illustrates the ratio of the number of the distinct records associated with the second attribute (drugs) relevant to the number of the distinct records associated with the first attribute (the diagnosis code 284.8) determined by the modules 604-606. In this embodiment, this part of the graph 904 is a bar graph format; alternative formats may include pie charts, venn diagrams, histograms, line diagrams, and the like. The ratio may indicate a frequency of those drugs as used on those individuals diagnosed with aplastic anemia. The other part of the graph 904 includes a box plot for displaying temporal statistics. This box plot illustrates temporal clustering in days including values corresponding to the right y-axis: for example, each box may be bounded by plus or minus one standard deviation; the whiskers (small vertical lines connected to the box) may represent plus or minus two standard deviations. Alternately temporal percentiles can be used, such as 25th to 75th percentiles for the box edges and 5th to 95th percentiles for the "whiskers". The code easily accommodates user defined ranges within its interpolation mechanism. The results can either be sorted or ranked by tightness of boxes or by percentage of numbers of records associated with the particular drug.

Figure 10:
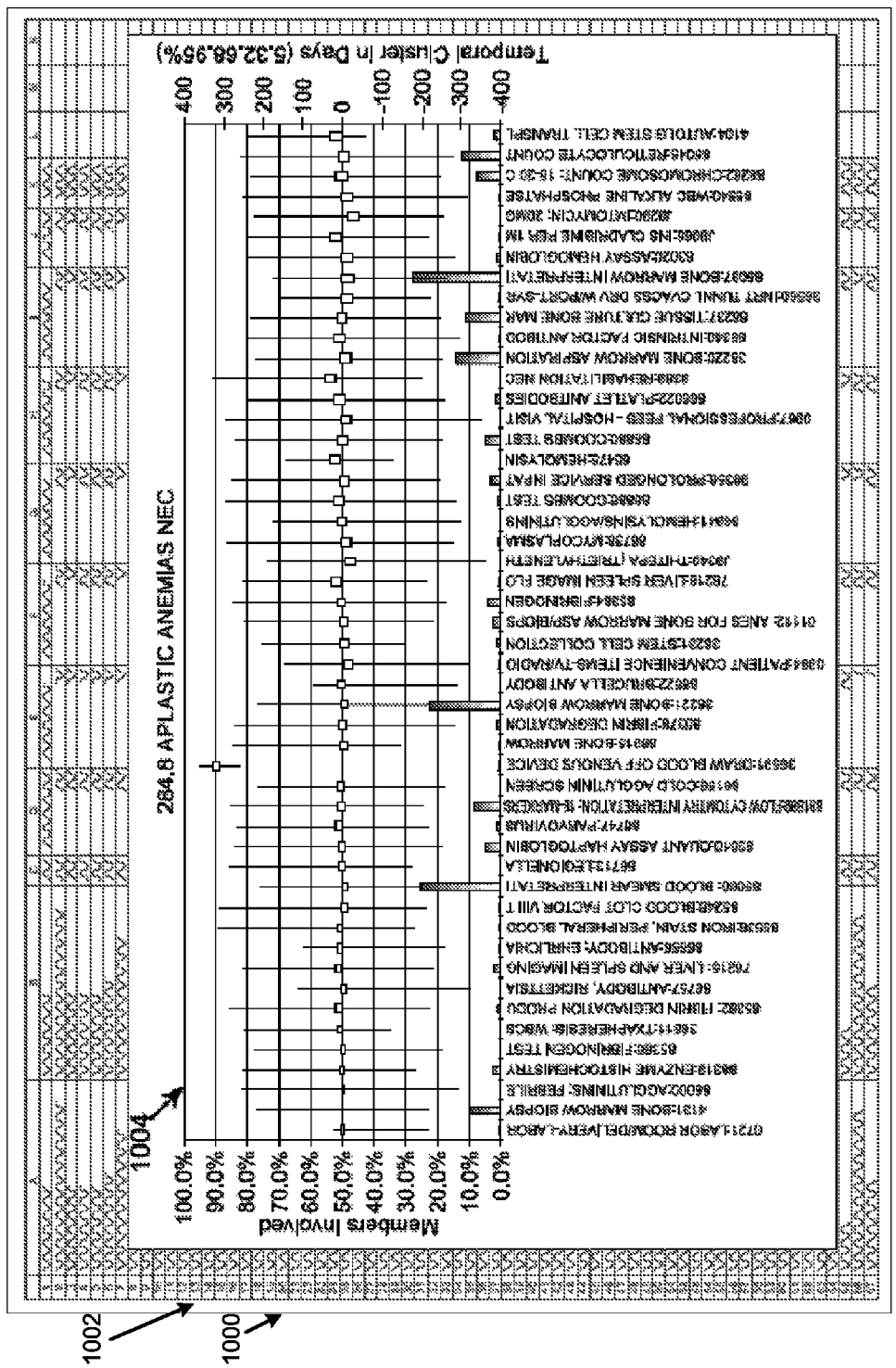
FIG. 10 is an output illustrating one embodiment of graphical representation generated by rapid generation of attribute driven temporal clustering.

FIG. 10 illustrates one embodiment of a graphical output 1000 including a table 1002 and a graph 1004, which illustrate the temporal clustering and frequency of various procedures that around the disease diagnosed by the code 284.8.

Figure 11:
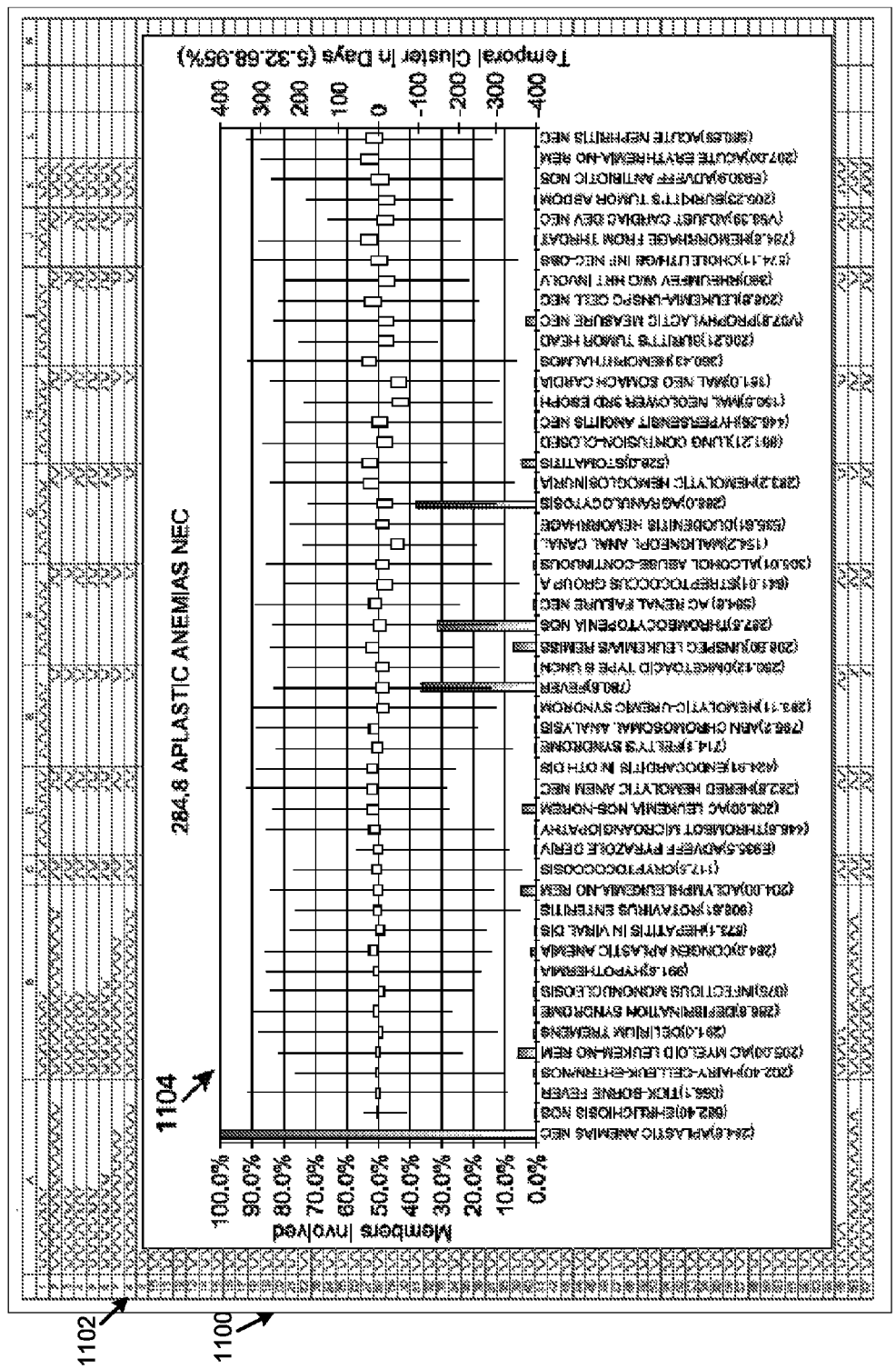
FIG. 11 is an output illustrating one embodiment of graphical representation generated by rapid generation of attribute driven temporal clustering.

FIG. 11 illustrates one embodiment of a graphical output 1100 including a table 1102 and a graph 1104, which illustrate the temporal clustering and frequency of various diagnosis codes that may be relevant to the diagnosis code 284.8.

All of the methods disclosed and claimed herein can be made and executed without undue experimentation in light of the present disclosure. While the apparatus and methods of this invention have been described in terms of preferred embodiments, it will be apparent to those of skill in the art that variations may be applied to the methods and in the steps or in the sequence of steps of the method described herein without departing from the concept, spirit and scope of the invention. In addition, modifications may be made to the disclosed apparatus and components may be eliminated or substituted for the components described herein where the same or similar results would be achieved. All such similar substitutes and modifications apparent to those skilled in the art are deemed to be within the spirit, scope, and concept of the invention as defined by the appended claims.

What is claimed is:

1. A method for temporal clustering of records comprising:
    receiving a first attribute and a second attribute different than the first attribute, wherein each of the first attribute and the second attribute comprises an index date and one of: a medical code, a diagnosis, a lab test, a specific stage of disease, a drug treatment, and a procedure;
    searching a database stored on a data storage device to obtain a first group of records associated with the first attribute;
    searching, with a processing device, the first group of records to obtain a second group of records associated with the second attribute;
    generating, with a processing device, a temporal relationship between the first attribute and the second attribute by determining a ratio of the second group of records versus the first group of records, wherein the ratio represents a probability of an occurrence of the second attribute when an occurrence of the first attribute exists, determining a time frame between the occurrence of the first attribute and the occurrence of the second attribute for the second group of records associated with the first and second attributes, and normalizing each of the second group of records with the index date of the first attribute by subtracting the occurrence time of the first attribute from the occurrence time of the second attribute for each of the second group of records; and
    generating an output comprising a graphical representation of the temporal relationship.

2. The method of claim 1, further comprising narrowing the first or second group of records according to a selected time window.

3. The method of claim 1, wherein generating the temporal relationship further comprises counting distinct records in the second group of records.

4. The method of claim 3, wherein generating the temporal relationship further comprises computing a ratio of the number of distinct records in the second group and the number of distinct records in the first group.

5. The method of claim 1, wherein generating the temporal relationship further comprises normalizing the second attribute of records in the second group by the index date associated with the first attribute.

6. The method of claim 5, wherein generating the temporal relationship further comprises calculating one or more temporal statistics of the second group of records.

7. The method of claim 6, wherein generating the temporal relationship further comprises identifying and removing outliers.

8. A system for temporal clustering of records comprising:
a data storage device configured to store a database comprising a plurality of records;
a server in data communication with the data storage device, suitably programmed to:
receive a first attribute and a second attribute different than the first attribute, wherein each of the first attribute and the second attribute comprises one of: a medical code, a diagnosis, a lab test, a specific stage of disease, a drug treatment, and a procedure;
search a database stored on a data storage device to obtain a first group of records associated with the first attribute;
search, with a processing device, the first group of records to obtain a second group of records associated with the second attribute;
generate, with a processing device, a temporal relationship between the first attribute and the second attribute by determining a ratio of the second group of records versus the first group of records, wherein the ratio represents a probability of an occurrence of the second attribute when an occurrence of the first attribute exists, determining a time frame between the occurrence of the first attribute and the occurrence of the second attribute for the second group of records associated with the first and second attributes, and normalizing each of the second group of records with the index date of the first attribute by subtracting the occurrence time of the first attribute from the occurrence time of the second attribute for each of the second group of records; and
generate an output comprising a graphical representation of the temporal relationship.

9. The system of claim 8, the server further programmed to:
narrow the first or second group of records according to a selected time window.

10. The system of claim 8, wherein to generate the temporal relationship, the server is further programmed to count distinct records in the second group of records.

11. The system of claim 10, wherein to generate the temporal relationship, the server is further programmed to compute a ratio of the number of distinct records in the second group and the number of distinct records in the first group.

12. The system of claim 8, wherein to generate the temporal relationship, the server is further programmed to normalize the second attribute of records in the second group by an index date associated with the first attribute.

13. The system of claim 12, wherein to generate the temporal relationship, the server is further programmed to calculate one or more temporal statistics of the second group of records.

14. The system of claim 13, wherein to generate the temporal relationship, the server is further programmed to identify and remove outliers.

15. A tangible computer program product comprising a non-transitory computer readable medium having computer usable program code executable to perform operations comprising:
receiving a first attribute and a second attribute different than the first attribute, wherein each of the first attribute and the second attribute comprises one of: a medical code, a diagnosis, a lab test, a specific stage of disease, a drug treatment, and a procedure;
searching a database stored on a data storage device to obtain a first group of records associated with the first attribute;
searching the first group of records to obtain a second group of records associated with the second attribute;
determining a temporal relationship between the first attribute and the second attribute by determining a ratio of the second group of records versus the first group of records, wherein the ratio represents a probability of an occurrence of the second attribute when an occurrence of the first attribute exists, determining a time frame between the occurrence of the first attribute and the occurrence of the second attribute for the second group of records associated with the first and second attributes, and normalizing each of the second group of records with the index date of the first attribute by subtracting the occurrence time of the first attribute from the occurrence time of the second attribute for each of the second group of records; and
generating an output comprising a graphical representation of the temporal relationship.

16. The tangible computer program product of claim 15, further comprising narrowing the first or second group of records according to a selected time window.

17. The tangible computer program product of claim 15, wherein determining the temporal relationship further comprises counting distinct records in the second group of records.

18. The tangible computer program product of claim 17, wherein determining the temporal relationship further comprises computing a ratio of the number of distinct records in the second group and the number of distinct records in the first group.

19. The tangible computer program product of claim 15, wherein determining the temporal relationship further comprises normalizing the second attribute of records in the second group by an index date associated with the first attribute.

20. The tangible computer program product of claim 19, wherein determining the temporal relationship further comprises calculating one or more temporal statistics of the second group of records.

21. The tangible computer program product of claim 20, wherein determining the temporal relationship further comprises identifying and removing outliers.

22. The method of claim 6, wherein calculating one or more temporal statistics of the second group of records comprises:

calculating a percentile value from the second group of records; and calculating a smallest time difference between two interpolated percentiles.

23. The system of claim 13, wherein to calculate the one or more temporal statistics of the second group of records, the server is programmed to:

calculate a percentile value from the second group of records; and calculate a smallest time difference between two interpolated percentiles.

24. The tangible computer program product of claim 20, wherein calculating one or more temporal statistics of the second group of records comprises:

calculating a percentile value from the second group of records; and calculating a smallest time difference between two interpolated percentiles.

* * * * *